United States Patent Office 3,767,824
Patented Oct. 23, 1973

---

3,767,824
METHOD OF VITAMIN COATING CEREAL PRODUCTS
William L. Keyser, East Dundee, and Walter J. Zielinski, Ingleside, Ill., assignors to The Quaker Oats Company, Chicago, Ill.
No Drawing. Filed May 17, 1971, Ser. No. 144,348
Int. Cl. A23l 1/30
U.S. Cl. 426—290                              4 Claims

ABSTRACT OF THE DISCLOSURE

This invention relates to a process of vitamin coating cereal products and particularly to a new vitamin coating procedure for ready-to-eat breakfast cereals.

BACKGROUND OF THE INVENTION

Field of the invention

This invention relates to a process of making a vitamin coated ready-to-eat cereal product. More particularly this invention relates to a process for making a palatable vitamin coated cereal product.

Description of the prior art

Various methods for adding vitamins to ready-to-eat cereal products have been tried. Each of the methods used heretofore, however, has had certain disadvantages. For example, vitamins have been added to the cereal dough before it is cooked. The major difficulty with this process is that many of the vitamins, for example vitamin A, vitamin $B_1$, vitamin $B_{12}$, vitamin C, and vitamin D, are unstable and partially deactivate during the cooking step. Vitamin degradation is particularly undesirable because of the formation of distasteful odors and flavors, as well as the loss of vitamin activity.

To overcome some of the difficulties associated with mixing the vitamins into the uncooked dough, vitamins have been sprayed in an aqueous solution or oil emulsion on the surface of a cooked dough. To reduce the moisture content of the cereal product, to provide the desired crispness, and to develop a desired flavor in the dough, the vitamin coated dough is subjected to an intensive heat transfer step. This heat transfer step is commonly referred to as "drying," "drying and toasting," "drying and puffing," or "drying," "drying and toasting," "drying and puffing," precise manner in which it is carried out. Hereinafter the step will be referred to as "drying." This process suffers from the same difficulties as the process wherein the vitamins are mixed in the uncooked dough. Namely, many of the more heat labile vitamins degrade during the drying step. Further short comings peculiar to this process are that there is a large material loss of vitamins during the spraying step due to "spray over" and that the distribution of vitamins on the cooked dough is customarily uneven.

Furthermore, as sufficient vitamins are added to the cereal product by the prior art processes to provide the adult minimum daily requirements or the recommended daily allowance established by the U.S. Food and Drug Administration, the ready-to-eat cereal product develops a decidedly and wholly undesirable medicinal flavor.

SUMMARY OF THE INVENTION

It is an object of this invention to provide a process for applying vitamins to a ready-to-eat cereal product whereby the more heat labile vitamins are not substantially deactivated.

Another object of this invention is to provide a process wherein there is a low material loss of vitamins.

Still another object of this invention is to provide a process whereby the vitamins are applied substantially evenly to the surface of the ready-to-eat cereal product.

Yet another object of this invention is to provide a process wherein up to the adult minimum daily requirements or the recommended daily allowance of vitamins can be added as a coating to the cereal product without producing an undesirable medicinal flavor.

The objects of this invention are accomplished by a process of producing a vitamin coated ready-to-eat cereal product which comprises the steps of:

(a) Drying a precooked cereal having a moisture content between about 1 and about 30 percent by weight until the moisture content thereof is between about 0.5 and 3 percent, and (b) Coating said dried cereal with vitamins coated with a fatty composition while the cereal is at a temperature between the melting point of the fatty composition and 300° F., said fatty composition comprising a saturated aliphatic acid having between 12 and 20 carbon atoms inclusive or a glyceride having the formula:

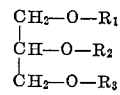

wherein $R_1$ is an acyl radical derived from a saturated aliphatic acid having between 12 and 20 carbon atoms per molecule and $R_2$ and $R_3$ are hydrogen or the same as $R_1$.

In this invention it is essential that all the vitamins be coated with said fatty composition. Suitable saturated acids for coating the vitamins include for example, stearic acid, palmitic acid, myristic acid, and lauric acid. The saturated aliphatic fatty acid glycerides for coating the vitamins may contain between 0 and 2 hydroxy groups inclusive. The glycerides employed in the present invention furthermore need not be pure compounds, but can be glycerides for example mixtures of the above mentioned saturated aliphatic fatty acids.

The vitamins are coated by suspending the particular vitamin in a molten fatty material and chilling the resulting suspension or solution to produce particles of the vitamin having a coating of the fatty composition. The coated vitamins may be blown through a small orifice to provide beadlets of vitamins the cross section of which is determined by the diameter of the orifice. Satisfactory coated vitamins of this type are described in U.S. Pats. 3,037,911; 3,080,292; and 3,080,293. Higher temperatures than necessary to form the suspension or solution are preferably avoided to prevent deactivation of the heat labile vitamins. We have found that from about 0.05 to about 5 percent by weight based on the weight of the cereal product of the fatty composition is satisfactory in the preferred embodiment of our invention.

The vitamins, thiamin (vitamin $B_1$), riboflavin (vitamin $B_2$), niacinamide, ascorbic acid (vitamin C) and cyanocobalamin (vitamin $B_{12}$), vitamin A, and vitamin D, for example, can be coated with the above described fatty composition for use in accordance with this invention. Satisfactory and commercially available vitamins coated with said fatty composition are available from Merck & Company, Inc., Rahway, N.J., under the trademark "Mercote" and from Hoffman-La Roche, Inc., Nutley, N.J., under the trademark "Rocoat."

The vitamins useful in this invention are well known and commercially available. For example, vitamin A is commercially available as the acetate and palmitate derivative. Niacin is available as niacinamide and vitamin $B_6$ is available as pyridoxine hydrochloride. Vitamin C is available as sodium ascorbate and ascorbic acid. All the vitamins necessary to provide the minimum daily requirements are similarly readily available.

While the size of the particles of vitamins is not narrowly critical, they must be no larger than will adhere to the cereal piece. This size is dependent on the melting point of the fatty composition forming the coating, the geometry of the particle, and the temperature of the dried cereal piece to which the vitamin particle is annealed. The maximum size can be easily determined by one skilled in the art by a few routine experiments. Examples of satisfactory particle sizes are set forth by way of example in the description of the preferred embodiments but said examples are clearly not intended to limit the scope of this invention.

In this application the words "precooked cereal having a moisture content between 1 and 30 percent by weight" are used in the same manner as in the prior art. The precooked cereal is prepared by any of the known processes, such as extrusion, puffing, or rotary cooking. The grain in the precooked cereal may be for example, rice, wheat, oats, corn, barley, or any combination of two or more such grains. The precooked cereal may be formed into a variety of shapes and sizes by well-known techniques in the art. It is also to be understood that by "ready-to-eat cereal product" we mean cereal based products which are suitable for ready-to-eat snacks and breakfast cereals.

The precooked cereal is dried under temperatures and for times as is well known in the art depending primarily on the nature and size of the cereal piece, humidity and velocity of the air in the drier, and the amount of moisture present in the cereal. For example, a precooked cereal having a moisture content of 20 to 35 percent by weight required a period of 3 to 15 minutes at a temperature of 200 to 400° F. to reduce the moisture content of the cereal to 2.0 percent. Drying temperatures lower than those specified above may of course be employed if desired. Drying is continued until the moisture content of the precooked cereal is between about 0.5 and 3 percent by weight.

After drying and while it is hot, the precooked cereal is coated with vitamins. While we do not wish to be bound to any theory we believe that the hot cereal product causes the fatty coating on the vitamins to soften and adhere to the cereal. While the temperature of the dried precooked cereal product during the vitamin coating procedure is not narrowly critical, it should be sufficient to soften the fatty coating on the vitamins. Much higher temperatures than necessary to soften the fatty coating should be avoided to prevent deactivation of the heat labile vitamins. We have found it advantageous to coat the dried cereal with vitamins while the cereal is between about 160° and about 200° F. but temperatures up to 300° F. may be used. The fatty coated vitamins may optionally be preheated to a temperature less than necessary to deactivate them before applying them to the hot dried precooked cereal. After coating the precoated dried cereal product with vitamins, the cereal product is immediately cooled and is ready for human consumption. Sufficient vitamins may be added to the cereal product to provide the adult minimum daily requirements or recommended daily allotments when consumed in an amount reasonably suited for adult consumption without the development of an unpleasant medicinal taste.

DESCRIPTION OF THE PREFERRED EMBODIMENTS

The following embodiments of this invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

In the following examples the temperature of the dried cereal product is taken to be the temperature of the air in the drier after the cereal has been in the drier for a sufficient time to equilibrate with the air temperature.

EXAMPLE 1

850 grams of an extruded breakfast cereal product having a bulk density of 5.5 ounces per 121.5 cubic inch and a moisture content of 5 percent by weight was toasted at 400° F. for 45 seconds in a Proctor & Schwartz Laboratory model oven. An air flow was directed upward through the product at the rate of 250 cubic feet per minute. At the end of the toasting period the dried cereal had a moisture content of 2.0 percent by weight and weighed 824 grams.

The dried cereal was tumbled with a vitamin premix immediately after toasting and while the cereal was at a temperature of 290° F. The vitamin pre-mix was composed of 69,600 $\mu$g. of beta-carotene coated with 139,200 $\mu$g. of a saturated aliphatic acid having between 12 and 20 carbon atoms or a glyceride thereof; 290 mg. of niacin coated with 580 mg. of stearic acid; 34.8 mg. of riboflavin coated with 69.6 mg. of stearic acid; 29 mg. of thiamin coated with 58 mg. of glycerol monostearate; 670 mg. of ascorbic acid coated with 1340 mg. of a saturated aliphatic acid having between 12 and 20 carbon atoms or a glyceride thereof; 58 mg. of vitamin $B_6$ coated with 116 mg. of stearic acid; 145 mg. of vitamin $B_{12}$ coated with 290 mg. of a saturated aliphatic acid having between 12 and 20 carbon atoms or a glyceride thereof; 290 $\mu$g. of vitamin $D_2$ coated with 580 $\mu$g. of a saturated aliphatic acid having between 12 and 20 carbon atoms or a glyceride thereof; and 29 g. of powdered sugar as a carrier. All of the above coated vitamins passed through a Standard U.S. 20 mesh screen.

The vitamin coated cereal piece was tumbled for 10 seconds after the addition of the vitamin pre-mix to insure even distribution of the vitamins on the surface of each cereal piece.

The vitamin coated ready-to-eat cereal product prepared by the above process had all the vitamins for which an adult minimum daily requirement has been established and had the recommended daily allotments of vitamins $B_6$ and $B_{12}$ for an adult male per 1 ounce serving of the product.

EXAMPLE 2

Twenty-six ounces of Kellogg's corn flakes (sold by Kellogg Company, Battle Creek, Mich.) were dried as described in Example 1 for 2 minutes at 170° F.

While the temperature of the dried flakes was at 170° F. Test 1 was made as follows: 13 ounces of the flakes were tumbled with 15.6 mg. of riboflavin coated with 31.2 mg. of stearic acid, 13.0 mg. of thiamin coated with 26.0 mg. of glycerol monostearate, and 1 g. of powdered sugar as a carrier.

Test 2 was made by cooling 13 ounces of the dried flakes to room temperature and then tumbling them with 15.6 mg. of riboflavin coated with 31.2 mg. of stearic acid, 13.0 mg. of thiamin coated with 26.0 mg. of glycerol monostearate, and 1 g. of powdered sugar as a carrier.

EXAMPLE 3

Fifty-two ounces of Kellogg's corn flakes were dried as described in Example 1 for 2 minutes at 200° F.

In Test 3, 13 ounces of the dried flakes were tumbled with 15.6 mg. of riboflavin coated with 31.2 mg. of stearic acid, 13.0 mg. of thiamin coated with 26.0 mg. of glycerol monostearate, and 1 g. of powdered sugar as a carrier while the temperature of the flakes was at 200° F.

Test 4 was made by cooling 13 ounces of the dried flakes to room temperature and then tumbling them with 15.6 mg. of riboflavin coated with 31.2 mg. of stearic acid, 13.0 mg. of thiamin coated with 26.0 mg. of glycerol monostearate, and 1 g. of powdered sugar as a carrier.

In Test 5, 23 ounces of the dried flakes were cooled to room temperature with no further treatment.

Samples of the products produced in Tests 1, 2, 3, and 4 were analyzed for riboflavin and thiamin content. Samples from Tests 1 and 3 were found to contain more than 90 percent of the amount of riboflavin and thiamin found in samples from Tests 2 and 4. Tests 1 and 3 are in accordance with this invention. Tests 2 and 4 are not in accordance with this invention but were prepared to compare with Tests 1 and 3 to demonstrate that the deactivation and material loss of vitamins are small and that substantially all of the fatty coated vitamins adhere when applied to dried corn flakes at a temperature of 170° F. or 200° F.

Samples from Tests 1 and 3 were compared with samples from Test 5 by 36 subjects. The taste data are reported in the following tables:

TABLE I

|  | Test 1 | Test 5 |
|---|---|---|
| Appearance | 6.81 | 6.83 |
| Flavor | 6.89 | 7.11 |
| Sweetness | 6.86 | 6.97 |
| Eating qualities | 6.72 | 7.03 |
| Aftertaste | 6.58 | 6.89 |
| Overall Acceptance | 6.81 | 7.03 |

The grading scale used above was 1–9. The rating of 1 corresponded to extreme dislike and of 9 to extreme liking. On a forced choice basis, 23 of the 36 preferred samples from Test 1.

TABLE II

|  | Test 3 | Test 5 |
|---|---|---|
| Appearance | 9.97 | 6.94 |
| Flavor | 6.86 | 6.72 |
| Sweetness | 6.75 | 6.67 |
| Eating qualities | 6.92 | 6.94 |
| Aftertaste | 6.50 | 6.67 |
| Overall acceptance | 6.75 | 6.75 |

On a forced choice basis 21 of the 36 subjects preferred samples from Test 3.

Test 5 is not in accordance with this invention but was prepared to compare the flavor characteristics of flakes subjected to the same heat treatment as those in Tests 1 and 3, to the flavor of the flakes in Tests 1 and 3 which additionally had been coated with the adult minimum daily requirements of riboflavin and thiamin. The data in Tables I and II indicates that the product of this invention in Tests 1 and 3 had no undesirable medicinal taste. Riboflavin and thiamin were chosen for this comparison inasmuch as these vitamins usually have no objectional flavor when applied to a food product in an amount sufficient to provide the adult minimum requirements.

EXAMPLE 4

Thirteen ounces of Kellogg's corn flakes were dried as described in Example 1 for 2 minutes at 150° F. The dried flakes were tumbled with 15.6 mg. of riboflavin coated with 31.2 mg. of stearic acid while the flakes were at 150° F. Substantially none of the coated vitamins adhered to the flakes.

EXAMPLE 5

Following the procedure of Example 4, except that the flakes were dried and coated at 160° F., substantially all of the coated vitamins adhered to the flakes.

The purpose of Examples 4 and 5 is to show that the flakes must be at a temperature greater than the melting point of the fatty composition coating the vitamins. In Example 4 the flakes were below the melting point of stearic acid (156–158° F.) and the vitamins did not adhere to the flakes. Example 4 is not in accordance with this invention. In Example 5 the flakes were at a temperature above the melting point of stearic acid and the vitamins adhered to the flakes.

EXAMPLE 6

Following the procedure of Example 1 except that the beta-carotene was coated with gelatin instead of said fatty composition. Less than 2 percent by weight of the adult minimum daily requirement of vitmain A was found on analysis to be present.

One purpose of this example is to show that it is absolutely essential to the process of this invention that all of the vitamins be coated with the above described fatty composition. This example is not in accordance with the process of this invention.

The above examples clearly demonstrate the accomplishment of this invention. Example 1 demonstrates that a ready-to-eat vitamin coated cereal product is provided by the process of our invention with up to the minimum adult daily requirements of vitamins.

Examples 2 and 3 show that coated vitamins are not substantially deactivated by the process of invention and that there is substantially no material loss of vitamins, i.e., substantially all of the vitamins adhere to the cereal piece. Furthermore, the vitamins are evenly distributed over all of the cereal pieces. Examples 2 and 3 further show that the vitamin coated product produced by the process of this invention with the minimum adult daily requirements of riboflavin and thiamin which are most likely to be objectionable had no undesirable medicinal flavor.

Examples 4 and 5 demonstrate that the flakes must be at a temperature higher than the melting point of the fatty composition coating the vitamins to cause substantially all of the vitamins to adhere to the cereal piece.

Example 6 demonstrates that it is essential that all the vitamins to be coated on the cereal product be coated with the above described fatty composition.

From the foregoing description we consider it to be clear that the present invention contributes a substantial benefit to the ready-to-eat cereal art by providing a new and useful process for making a vitamin coated cereal product.

We claim:
1. A process of producing a vitamin coated ready-to-eat cereal product which comprises the steps of:
 (a) drying a precooked cereal having a moisture content between about 1 and about 30 percent by weight until the moisture content thereof is between about 0.5 and 3 percent, and
 (b) coating said dried cereal with vitamins coated with a fatty composition while the cereal is at a temperature between the melting point of the fatty composition and 300° F., said fatty composition comprising a saturated aliphatic acid having between 12 and 20 carbon atoms inclusive or a glyceride having the formula:

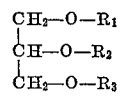

wherein $R_1$ is an acyl radical derived from a saturated aliphatic fatty acid having between 12 and 20 carbon atoms per molecule and $R_2$ and $R_3$ are hydrogen or the same as $R_1$.

2. The process as in claim 1 wherein said coated vitamins are preheated and then coated on said dried cereal.

3. The process as in claim 1 wherein the dried cereal is coated with the coated vitamins while the cereal is at a temperature between about 160° F. and about 200° F.

4. The process as in claim 1 wherein said fatty composition comprises 0.05 to 5 percent by weight of the cereal product.

References Cited

UNITED STATES PATENTS

| 2,712,499 | 7/1955 | La Pierre | 99—11 |
| 3,037,911 | 6/1962 | Stoyle | 99—11 X |
| 2,381,342 | 8/1945 | Furter | 99—11 |
| 2,401,293 | 6/1946 | Buxton | 99—83 |
| 2,508,477 | 5/1950 | Stievater et al. | 99—11 |
| 2,707,153 | 4/1955 | Beltman | 99—83 |
| 3,561,981 | 2/1971 | Roe et al. | 99—83 |

RAYMOND N. JONES, Primary Examiner

U.S. Cl. X.R.

426—311, 295, 72, 73

UNITED STATES PATENT OFFICE
CERTIFICATE OF CORRECTION

Patent No. 3,767,824     Dated October 23, 1973

Inventor(s) William L. Keyser and Walter J. Zielinski

It is certified that error appears in the above-identified patent and that said Letters Patent are hereby corrected as shown below:

Column 1, line 46, after "drying and puffing", insert -- or "drying, puffing and toasting" depending upon the --.
Column 2, line 31, after "saturated" insert --aliphatic--.

Signed and sealed this 7th day of May 1974.

(SEAL)
Attest:

EDWARD M. FLETCHER, JR.
Attesting Officer

C. MARSHALL DANN
Commissioner of Patents